Patented May 2, 1944

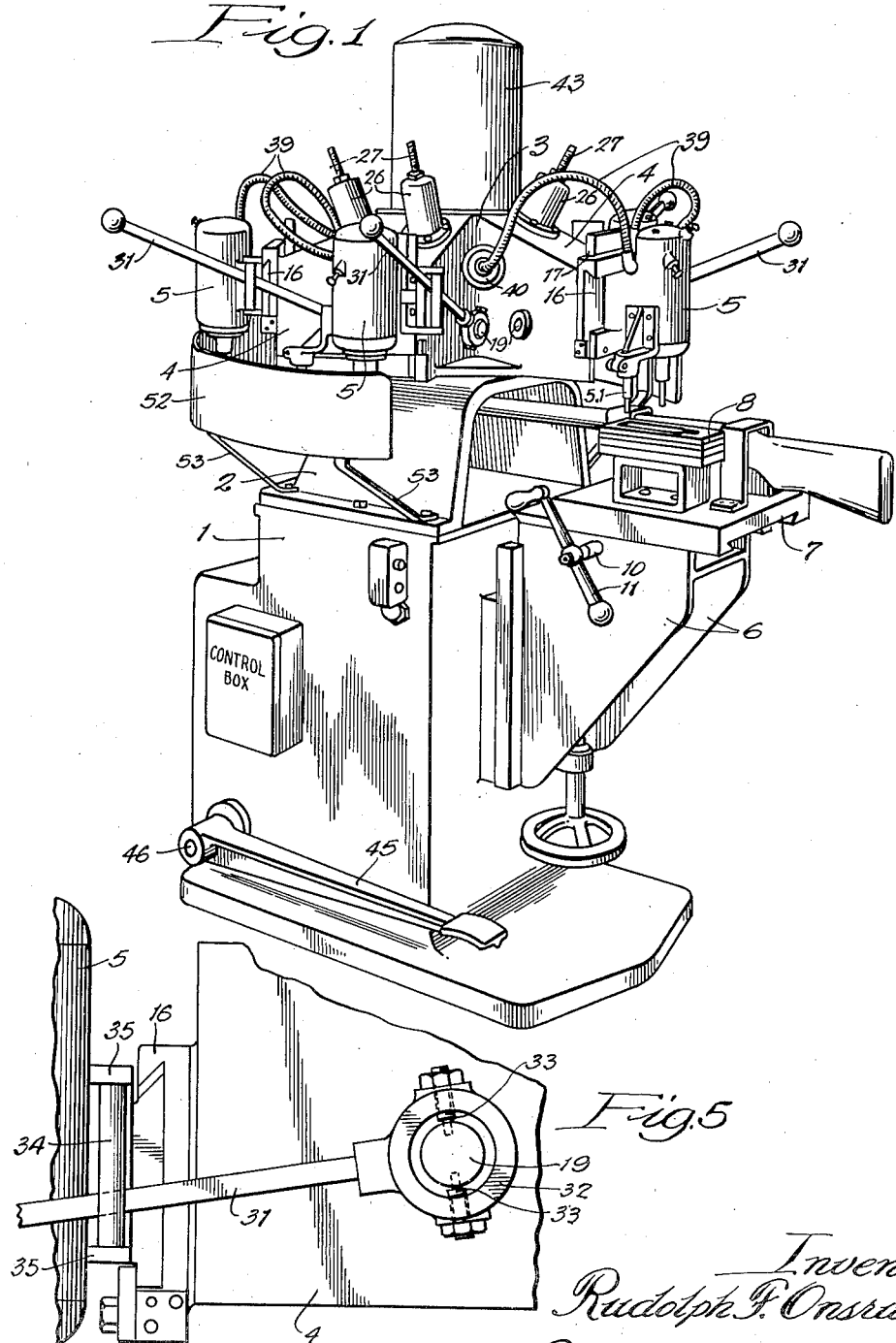

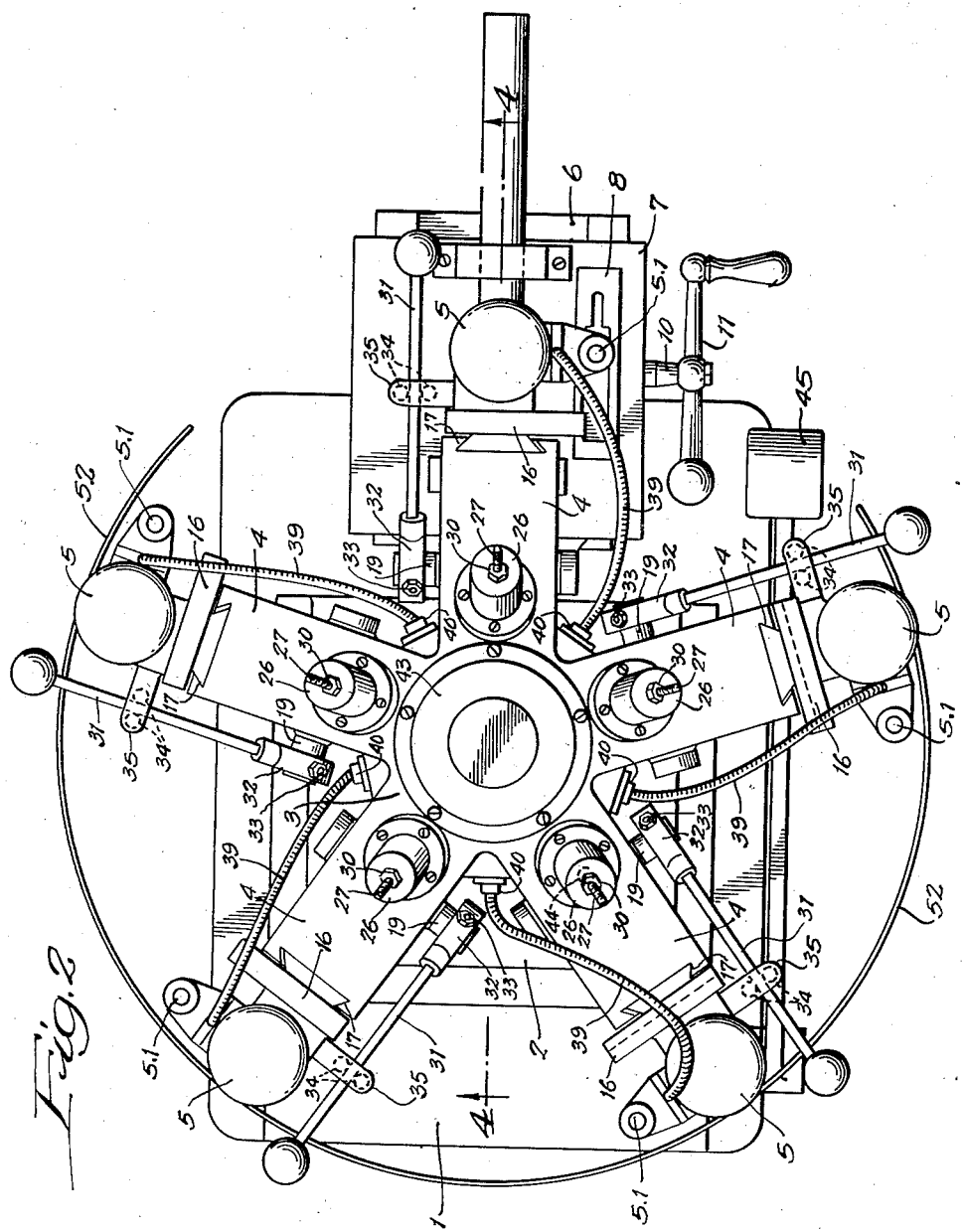

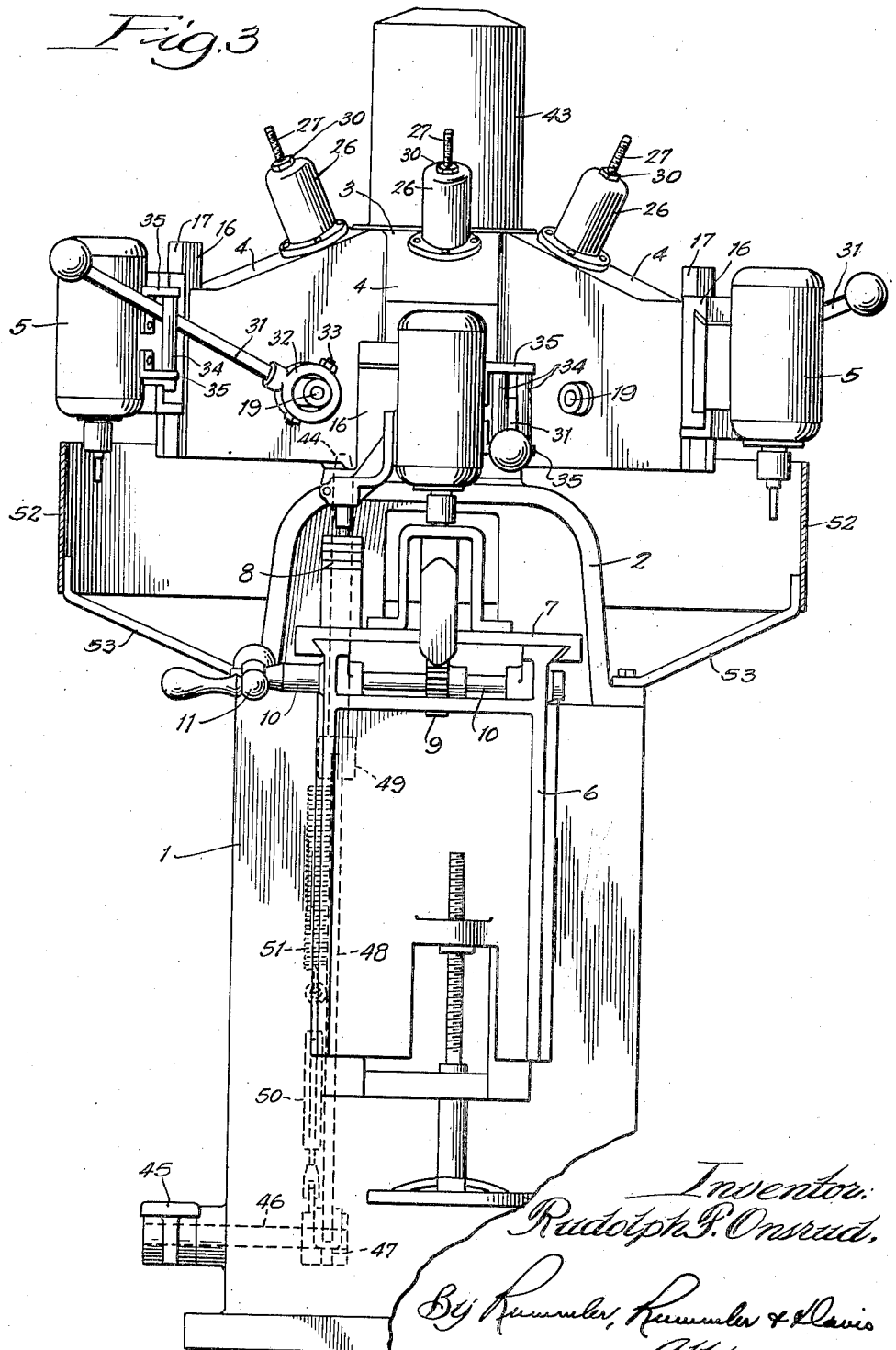

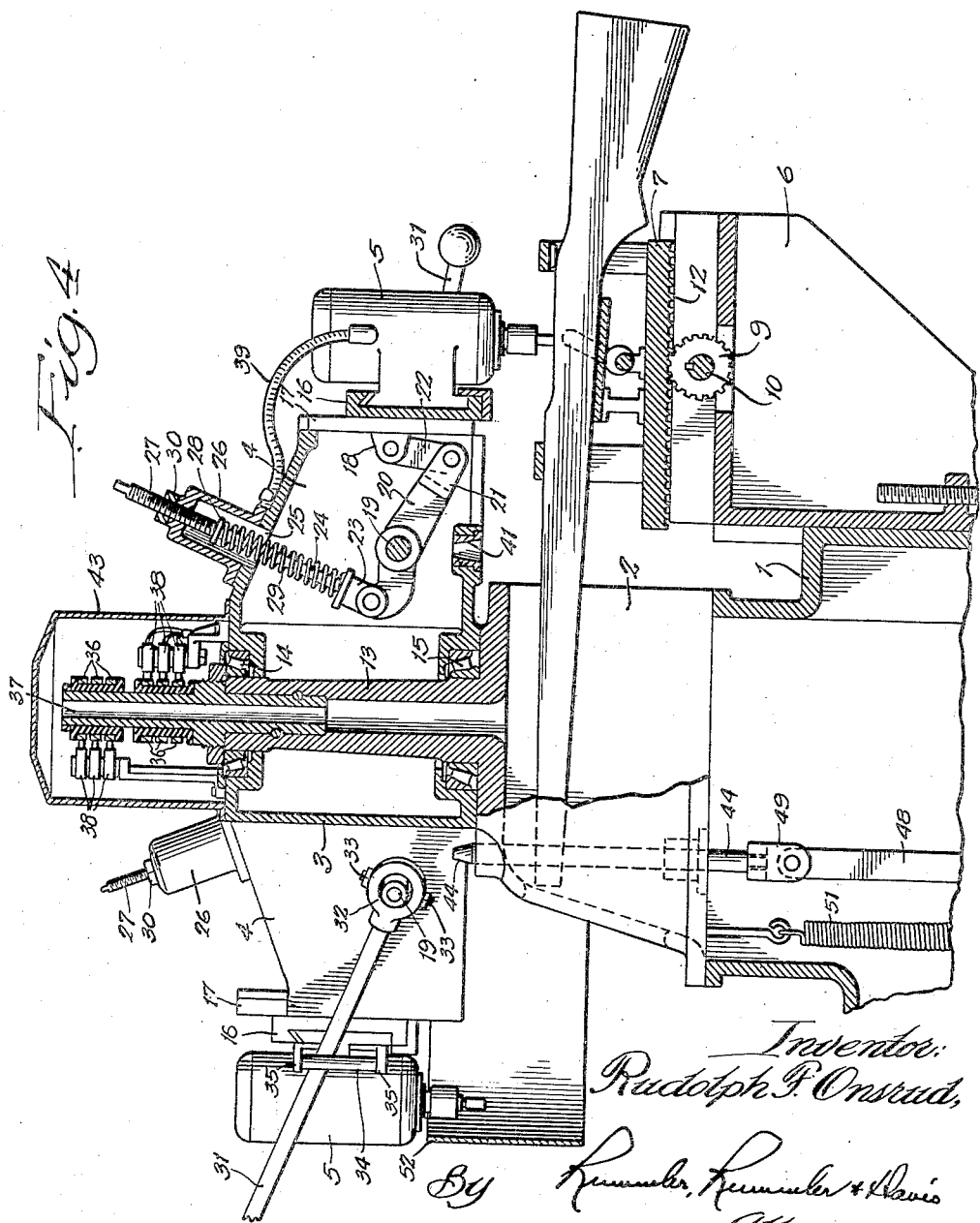

2,347,791

UNITED STATES PATENT OFFICE 2,347,791

TURRET HEAD ROUTER

Rudolph F. Onsrud, Chicago, Ill., assignor to Onsrud Machine Works, Inc., Chicago, Ill., a corporation of Illinois Application July 16, 1942, Serial No. 451,105

10 Claims. (Cl. 90—14)

This invention relates to improvements in profile routers and inletting machines and particularly to such devices having a plurality of high speed routers or spindle heads arranged for selective application to the work involved.

The main objects of this invention are to provide an improved router having a plurality of spindle heads arranged to be selectively positioned with respect to the object to be worked upon; to provide such a device in which the several spindle heads are individually operable when positioned to engage the work involved; to provide an improved turret-type mounting for a plurality of individual routers or spindle heads; to provide a turret-type mounting in which several vertically shiftable routers or spindle heads are individually counter-balanced; to provide an improved counter-balance for vertically shiftable machine tools; and to provide an improved spindle head mounting arranged for both axial and transverse movement of the spindle head by means of a single control element.

A specific embodiment of this invention is shown in the attached drawings in which:

Figure 1 is a perspective view in elevation of the improved router.

Fig. 2 is a top plan view of the device shown in Fig. 1.

Fig. 3 is a front elevation of the same.

Fig. 4 is a sectional view of the improved router as taken on line 4—4 of Fig. 2 and showing the counter-balance and power supply arrangement within the turret, and Fig. 5 is a fragmentary view in elevation showing the arrangement of the operating lever for individual manipulation of a spindle head.

In the form shown in the drawings and with particular reference to Fig. 1, the improved router or inletting machine comprises a base 1 upon which is mounted an arched turret support 2 arranged to carry a turret 3 mounted for rotation on a vertical axis and having a plurality of radially projecting spider arms or spindle head supports 4 each of which carries a spindle head 5.

The base 1 also mounts, at one side, a vertically adjustable carriage support or knee 6 upon which a work carriage or table 7 is mounted for horizontal movement in a radial direction with respect to the axis of rotation with the turret 3.

As shown in Figs. 1, 3 and 4 the object to be worked upon is clamped by any suitable means onto the carriage or table 7 and a templet or profile guide 8 is mounted along side the work to serve as a guide for movement of the spindle head in the course of the router operation, the spindle head 5 being provided with a follower 5.1 for this purpose.

As shown, movement of the spindle head with respect to the work is confined to a single plane, movement of the spindle head being either vertical or transverse or both, and horizontal longitudinal movement of the work is accomplished by means of the shiftable carriage 7. Adjustment of the carriage 7 is obtained by the usual rack and pinion arrangement shown in Figs. 3 and 4 and wherein the pinion 9 is mounted on a horizontal shaft 10, suitably journaled in the carriage mounting 6 and extending outwardly from one side thereof where an operating crank 11 is attached. The pinion 9 engages a rack 12 provided on the bottom surface of the carriage 7.

As shown in Fig. 4 the turret support 2 is provided with a vertically extending arbor or pivot 13 upon which the turret 3 is rotatively journaled between suitable thrust bearings 14 and 15, and the spider arms 4 of the turret extend radially outwardly with respect to the arbor 13 and the axis of rotation of the turret 3.

In the form shown each of the spider arms or spindle head supports 4 of the turret is hollow and carries a vertically disposed and vertically shiftable compound slide or tool carriage 16 at its outer end. The spindle head 5 is mounted for lateral movement in this compound slide or tool carriage.

The tool carriage or slide 16 is mounted for vertical movement in dovetail ways 17 formed at the end of the respective arm 4 and includes transverse or horizontal ways formed in its outer or face-side in which the spindle head 5 is mounted for lateral movement. The end of each spider arm 4 between the wave 17 is open and the slide 16 carries a pair of spaced ears 18 which project into the spider arm 4 through this opening.

Within the spider arm or spindle head support 4 is a horizontal operating shaft 19 which extends through the spider arm from side to side, the shaft 19 being disposed parallel with the slide 16 and suitably journaled in the side walls of the spider arm. This operating shaft carries a pair of opposed crank arms which are fixed on the shaft and positioned directly behind the slide 16. In the form shown these crank arms comprise the arms of a bell crank 20 and that arm which extends toward the slide 16 is provided with a clevis 21 between the jaws of which one end of a link 22 is pivotally attached. The other end of the link 22 is likewise pivotally connected between the ears 18 of the tool carriage or slide 16. The other arm of the bell crank 20 is pivotally connected to the fork or clevis 23 which is disposed on the end of a spring guide or rod 24.

The upper surface of the spider arm 4 is provided with an opening 25 over which is mounted a hollow dome-like cover 26; and an adjustable screw 27 is threaded through a tapped opening in the top end of the cover 26 so as to extend into the interior of the cover in alinement with the end of the crank arm on which the spring guide 24 is mounted. The adjusting screw 27 is provided with radial flange or collar 28 adjacent its inner end and a helical compression spring 29 is mounted between the collar 28 and the fork 23. The spring 29 is normally compressed between the fork 23 and the collar 28 of the adjusting screw and adjustment of the compression pressure is obtained by means of the adjusting screw so as to accommodate variations in the load, or weight of the slide 16 and spindle head 5, carried by the opposite arm of the bell crank 20. A lock nut 30 is provided on the outer side of the cover 26 to prevent inadvertent loss of adjustment of the adjustment screw 27.

Thus the bell crank 20 and the compression spring 29 through the link 22 act as a counterbalance for the weight of the compound slide 16 and the spindle head 5, the compression spring 29 being normally adjusted by means of the adjusting screw 27 to hold the compound slide 16 in its uppermost position between the ways 17 and to return the compound slide to this upper portion after it has been shifted downwardly during operation of the spindle head.

Manipulation of the compound slide or tool carriage 16 and the spindle head 5 is accomplished by means of an operating lever 31 which is attached to one end of the shaft 19 which projects outwardly from the spider arm 4, by means of a swivel or universal connection 32.

The swivel 32 is a circular member in the form of a large eye into one side of which the control lever 31 is fastened and the swivel is connected to the shaft 19 by means of a pair of opposed pins or pintles 33 threaded through the side of the swivel in the direction normal to the lever 31 and the axis of the shaft 19. The pins or pintles 33 have pivot end portions which engage in suitable, drilled sockets in the shaft 19. Thus the swivel 32 permits lateral swinging movement of the operating lever 31 about the axis of the pins 33 and at the same time permits the lever 31 to apply a turning force to the shaft 19.

As shown the operating lever 31 extends forwardly from the spider arm 4 to the front part of the machine from which it can be manipulated by the operator. The lever 31, however, passes between a pair of spaced guide rods 34 which are mounted between angle brackets 35 secured to and projecting laterally from the spindle head 5. The guide rods are spaced apart just enough to permit free passage of the lever 31 and are of a sufficient length to provide clearance for necessary vertical movement of the lever 31.

Thus lateral movement of the spindle head 5 in the front or face-side ways of the compound slide is obtained by swinging the lever 31 laterally on its pivots 33 and vertical movement of the spindle head 5 is had by shifting the lever 31 up or down between the guide rods 34 so as to turn the shaft 19 and thus cause vertical shifting of the compound slide 16 in the ways 17 at the end of the spider arm 4 by means of the crank arm 20 and link 22.

As shown the spindle heads 5 each comprise a vertically disposed high speed electric motor, the shaft projection or extension of which extends downwardly and carries the routing tool.

Power for each of the motors comprising the spindle heads 5 is obtained from a series of slip rings 36 mounted on a slip ring holder 37 carried at the upper end of the arbor or pivot 13 on which the turret 3 is mounted, the slip ring holder 37 being in the nature of an axial extension of the pivot 13. Electric current is supplied to the slip rings 36 in any suitable manner as by a cable, not shown, which extends through the hollow interior of the pivot 13 and an axial passage in the slip ring holder 37. The current is taken from the slip rings 36 by means of a plurality of brushes 38 and is led from the brushes to the respective spindle head motors by means of suitable cables 39, each of the cables 39 carrying at one end a suitable plug 40 which is attached to a receptacle mounted in the body of the turret 3 between the spider arms 4 as shown in Fig. 1. The current from the brushes 38 is led to the respective receptacles in any suitable manner such as through openings provided in the top side of the turret 3.

Thus by means of the slip ring and brush arrangement for transferring electric power to the respective spindle head motors the turret can be turned at will about the axis of the pivot 13 without danger of interrupting the power supply. As shown, the slip ring and collector brush apparatus is enclosed by a dome-like cover 43 which may be secured by any suitable means to the upper side of the turret 3 and which serves to keep dirt and dust from the slip rings and brushes.

In order to provide positive location of the several spindle heads with respect to the work mounted on the carriage 7, an indexing pin or stop pin 44 is provided as shown in Fig. 4 the stop pin being arranged to engage in a socket 41 located in the bottom side of each of spider arms 4. As shown the turret is provided with five spider arms, disposed equiangularly with respect to each other, and the stop pin 44 is so located so as to engage one of the rearward spider arms in order to avoid interference with the work carried by the table 7. It will be understood, however, that the stop pin or indexing pin may be located wherever convenience in the construction of the apparatus dictates.

The stop pin arrangement is actuated by means of the foot lever 45 mounted on the outwardly projecting end of a rock shaft 46, located within and near the bottom of the base 1. The shaft 46 carries a crank arm 47 on its inner end, and the end of the crank arm is connected to a vertically extending link 48 which has its upper end connected to the stop pin 44 by means of a clevis 49. The crank arm 47 is also attached, by means of a turnbuckle 50, to a tension spring 51 suspended from the upper part of the base 1. Thus the spring 50 holds the crank arm 47 in its upper position so as to keep the indexing or stop pin in engagement with the socket 41 in the respective arm of the turret 3, release of the stop pin being obtained only by depression of the foot lever 45.

In order to protect the routers carried by several spindle heads, which are not in working position with respect to the work on the carriage or table 7, a circular guard 52 is provided to surround the path of travel of the routers, excepting only the front part of the machine, the guard 52 being attached to the machine by means of a series of radial brackets 53 extending outwardly from the turret support.

In the embodiment of the improved routing machine herein shown and described, each of the spindle heads 5 comprises an electric motor, the frame of which is provided with an integral base portion designed to fit into the horizontal ways of the compound or cross-slide 16. Each motor is of a size and speed suitable for the particular cutting operation expected to be performed by the respective spindle head and cutting tool and hence, as shown in Figure 4, a plurality of slip ring and brush sets, 36 and 38, are provided to supply current of different frequencies to different ones of the several motors. For example, one slip ring and brush set may supply 60 cycle current for certain motors operating drills at 3600 R. P. M. or slower; and another slip ring and brush set may supply 240 or 360 cycle current for other high speed, motors driving router bits at 14,400 R. P. M. or 21,600 R. P. M. as the case may be.

In operation the stock to be worked upon is clamped onto the work carriage by suitable jigs or fixtures designed for quick release of the stock and placement of the next piece to be worked upon, the work carriage support knee 6 being adjusted to proper working height for the operation to be accomplished. The turret 3 is then rotated manually, upon releasing of the stop pin 44 by means of the foot lever 45, until the desired spindle head is located in working position with respect to the stock mounted on the carriage 7. The foot lever 45 is then released so that the stop pin or indexing pin 44 will lock the turret into the position to which it has been manually set. The desired spindle head motor is then started by means of a respective push button station, not shown, and the machine is ready for operation.

The routing or cutting operation is accomplished by manipulation of the operating lever 31 which, because of its universal connection on the operating shaft 19, can be shifted laterally so that movement is obtained not only to shift the spindle head vertically, but also laterally.

In order to guide the shifting of the spindle head 5 by means of the operating lever 31 during the routing operation, the guide pin or follower 5.1, which is rigidly connected to the spindle head 5, engages the templet or profile guide 8 fixedly mounted on the work carriage 7. Thus the operator need merely shift the operating lever 31 so that the guide pin or follower 5.1 will follow the form of the templet 8.

Horizontal movement of the carriage supporting the stock being worked upon is obtained by means of the crank 11 which moves the carriage toward and away from the axis of rotation of the turret 3. Thus the guide pin or follower can be made to trace the master pattern or templet 8 in all three dimensions.

When the routing operation has been completed the operator need merely release his hold on the operating lever 31 and the spindle head is automatically returned to its elevated position by the counter-balance mechanism which is actuated by the counter-balance spring 29. This counter-balance spring 29 acts against the rearwardly extending arm of the bell-crank 20 causing the operating shaft 19 to turn so as to lift the forwardly extending bell-crank arm, which is connected to the compound or cross-slide 16 by means of the link 22, thus causing the cross-slide to shift upwardly to the uppermost position in the ways 17 formed at the end of supporting arm 4.

The lifting force exerted by the counter-balance spring 29 is adjusted to accommodate various sizes and weights of the spindle heads by means of the adjusting screw 27 which upon being screwed inwardly increases the tension on the spring 29 and which upon being screwed outwardly lessens the tension of the spring 29. Once the adjusting screw 27 has been set it is locked against inadvertent turning by means of the lock nut 30 threaded onto the adjusting screw and bearing against the adjusting screw support 26.

The main advantages of the improved turret head router reside in the ability to bring successive spindle heads, carrying different types of cutting tools, into working position to engage with the stock without having to shift the stock, or the carriage on which it is mounted, from one machine to another in order to get different cuts, thus greatly speeding up the routing operation and making it possible to accomplish the complete routing job on one machine.

Another advantage of the improved router resides in the construction and arrangement of the spindle head supports and the counter-balance mechanism by which absolute ease of operation of the spindle head in both vertical and horizontal directions, thus permitting accurate and rapid routing procedures.

Other advantages are found in the arrangement wherein a single operating lever is utilized for both vertical and lateral shifting of the spindle head during the routing operation. This increases the efficiency and speed with which the routing operation can be accomplished, since the operator needs only one hand to guide the spindle head, leaving the other hand free to manipulate and shift the position of the work carriage.

Although but one specific embodiment of this invention is herein shown and described, it will be understood that numerous details of the structure shown may be altered or omitted without departing from the spirit of this invention as defined by the following claims.

I claim:

1. A device of the class described comprising a rotatable turret carrying spaced guideways thereon permitting axial and lateral movement, a plurality of angularly spaced spindle heads carried by said guideways for independent movement in both axial and lateral directions, a work carriage, and stop means coacting with said turret to locate said spindle heads selectively in working position with respect to said carriage, each of said spindle heads having a single operating lever engaging a spindle head and mounted on the turret so as to shift the spindle head in both lateral and axial directions.

2. A device of the class described comprising a rotatable turret carrying spaced guideways thereon permitting axial and lateral movement, a plurality of angularly spaced spindle heads carried by said guideways for independent movement in for both axial and lateral directions, each of said spindle heads comprising a motor having a tool carrying shaft extension, a work carriage, stop means coacting with said turret to locate said spindle heads selectively in working position with respect to said carriage, and an operating lever engaging each of said spindle heads and mounted on the turret so as to shift the same both axially and laterally.

3. A device of the class described comprising a turret rotatably mounted on a vertical axis carrying spaced guideways thereon permitting axial and lateral movement, a plurality of angularly spaced spindle heads mounted on said guideways parallel with the axis thereof and arranged for both axial and lateral shifting movement with respect to said turret, a work carriage mounted below the angular path of said spindle heads, an operating lever for each of said spindle heads engaging the same for shifting the heads both axially and laterally, counter-balance means for each of said spindle heads normally holding the same in uppermost vertical position, and means operable from outside of the turret for adjusting said counter-balance means.

4. A device of the class described comprising a turret rotatably mounted on a vertical axis, a plurality of angularly spaced vertically disposed slide members mounted on said turret, each slide member being mounted in vertical ways for up and down shifting movement, a spindle head shiftably mounted in horizontal ways on each of said slide members, an operating lever engaging each of said spindle heads arranged to shift the same horizontally on the respective slide member and to shift the latter vertically on said turret, and means to counter-balance the weight of each of said slide members and its respective spindle head.

5. A device of the class described comprising a turret mounted to rotate on a vertical axis, a plurality of vertically disposed angularly spaced spindle heads mounted on said turret, a compound slide member for each spindle head carried by the turret for independent vertical and horizontal shifting of the respective spindle head, an operating lever for each of said spindle heads having a universal connection at one end of said turret and a sliding connection intermediate its ends with said spindle head, and an adjustable counter-balance for each of said spindle heads normally urging the same upwardly.

6. A device of the class described comprising a turret mounted to rotate on a vertical axis and having a plurality of hollow radially projecting support arms, each of said support arms having an opening in its end, a vertically disposed slide member mounted in vertical ways on the end of each of said support arms, a spindle head mounted in horizontal ways on each slide member, a horizontally disposed operating shaft journaled within each of said support arms parallel with the respective slide member, opposed crank arms fixed on each operating shaft one of which crank arms extends toward the respective slide member and is connected thereto through the support arm end-opening by a pivoted link, an adjusting screw mounted on the upper side of each of said support arms and aligned with the other of the respective crank arms, a compression spring seated between each adjusting screw and the aligned crank arm, and each of said operating shafts having one end projecting from the side of the respective support arm, and an operating lever pivotedly connected to the projecting end of each operating shaft so as to swing about an axis normal thereto, said operating lever having a sliding connection with the respective spindle head.

7. A device of the class described comprising a turret mounted to rotate on a vertical axis, a plurality of vertically disposed angularly spaced spindle heads mounted on said turret, a compound slide member for each spindle head carried by the turret for independent vertical and horizontal shifting of the respective spindle head, and an operating lever for each of said spindle heads having a universal connection at one end to said turret and a sliding connection intermediate its ends with said spindle head.

8. A device of the class described comprising a turret mounted to rotate on a vertical axis, a plurality of vertically disposed angularly spaced spindle heads mounted on said turret, a compound slide member for each spindle head carried by the turret for independent vertical and horizontal shifting of the respective spindle head, and an operating lever for each of said spindle heads having a universal connection at one end to said turret and having a portion connected to said spindle head so that movement of the lever may move the spindle head in either a horizontal or vertical direction.

9. A device of the class described comprising a turret mounted to rotate on a vertical axis and having a plurality of hollow radially projecting arms, each of said arms carrying a vertically disposed slide member mounted in vertical ways on the end of each of said arms, a spindle head mounted in horizontal ways on each slide member, a horizontally disposed operating shaft journaled in each arm and means connecting each shaft with its respective vertically disposed slide member, and an operating lever pivoted to said operating shaft for lateral movement and being rotatable with the shaft for imparting turning movement thereto, said operating lever being connected to the spindle head to impart horizontal movement thereto as it is moved in a lateral direction.

10. A device of the class described comprising a turret mounted to rotate on a vertical axis and having a plurality of hollow radially projecting support arms each carrying a vertically extending way, each of said support arms having an opening in its end and a vertically disposed slide member mounted in said vertical ways, horizontal ways on each vertically disposed slide member and a spindle head mounted in said horizontal ways, a horizontally disposed operating shaft journaled within each of said support arms parallel with the respective slide member, means extending through the open end of each arm to connect the operating shaft to the respective slide member, spring means within the hollow supporting arm and connected to said shaft so as to rotate the same to move the spindle head into its uppermost position and adjusting means on each of said hollow arms and engaging the spring for adjustment thereto.

RUDOLPH F. ONSRUD.